(12) United States Patent
Roblin et al.

(10) Patent No.: US 9,242,629 B2
(45) Date of Patent: Jan. 26, 2016

(54) DRIVELINE CLUTCH VARIABLE CLUTCH CAPACITY REAPPLY, SHAPING AND LASH MANAGEMENT

(71) Applicant: GM GLOBAL TECHNOLOGY OPERATIONS LLC, Detroit, MI (US)

(72) Inventors: Michael William Roblin, North Royalton, OH (US); Kristopher J. Kokko, Novi, MI (US); Tony T. Hoang, Warren, MI (US); Brian L Spohn, Holly, MI (US); Min K. Kim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 358 days.

(21) Appl. No.: 13/864,307

(22) Filed: Apr. 17, 2013

(65) Prior Publication Data

US 2014/0315683 A1    Oct. 23, 2014

(51) Int. Cl.

| | |
|---|---|
| *B60W 10/02* | (2006.01) |
| *B60W 10/06* | (2006.01) |
| *B60W 10/115* | (2012.01) |
| *B60W 20/00* | (2006.01) |
| *F16H 61/06* | (2006.01) |

(52) U.S. Cl.
CPC ............ *B60W 10/02* (2013.01); *B60W 10/06* (2013.01); *B60W 10/115* (2013.01); *B60W 20/00* (2013.01); *B60W 2510/1015* (2013.01); *B60Y 2300/49* (2013.01); *F16H 2061/062* (2013.01); *Y10T 477/6425* (2015.01)

(58) Field of Classification Search
CPC .................... B60W 10/02; B60W 2510/0241; B60W 2510/1015; F16H 2061/062; Y10T 477/633; Y10T 477/635; Y10T 477/6352; Y10T 477/638; Y10T 477/6422; Y10T 477/735

See application file for complete search history.

(56) References Cited

U.S. PATENT DOCUMENTS

| | | | |
|---|---|---|---|
| 2008/0182722 A1* | 7/2008 | Colvin et al. | 477/180 |
| 2011/0118078 A1* | 5/2011 | Kraska et al. | 477/5 |
| 2011/0212809 A1* | 9/2011 | Tsutsui et al. | 477/5 |
| 2012/0172175 A1* | 7/2012 | Nedorezov et al. | 477/169 |

* cited by examiner

*Primary Examiner* — Huan Le

(57) ABSTRACT

Method to control a clutch device within a transmission selectively coupling an internal combustion engine to a driveline includes controlling slip of the clutch device in response to an engine autostart event. Controlling slip includes adjusting a commanded fill pressure to the clutch device to a first predetermined magnitude that exceeds a pressure threshold until the clutch device is filled, decreasing the commanded fill pressure from the first predetermined magnitude to a second predetermined magnitude below the pressure threshold, and adjusting the commanded fill pressure in accordance with a first ramping profile and in accordance with a subsequent second ramping profile when a transmission input speed achieves a desired first transmission input speed.

20 Claims, 2 Drawing Sheets

DRIVELINE CLUTCH VARIABLE CLUTCH CAPACITY REAPPLY, SHAPING AND LASH MANAGEMENT

TECHNICAL FIELD

This disclosure is related to torque management in hybrid powertrain systems.

BACKGROUND

The statements in this section merely provide background information related to the present disclosure. Accordingly, such statements are not intended to constitute an admission of prior art.

Known powertrain architectures include torque-generative devices that generate and transfer torque via a torque transmission device to a driveline including one or more drive wheels for traction to propel a vehicle. Torque-generative devices may include, e.g., an internal combustion engine and/or torque machine(s) powered by non-fossil fuel. The torque machine(s) use non-fossil fuels including, e.g., stored electric energy, stored hydraulic energy, and stored pneumatic energy to generate tractive torque. The torque machine(s) may transform vehicle kinetic energy that is transmitted through the drive wheels to energy that is storable in an energy storage device.

It is known to transition an engine from an OFF state to an ON state, e.g., fueled and spinning, when power provided from the engine is required. For instance, power from the engine may be required to charge the energy storage device of a hybrid powertrain. Additionally, the engine can be required to power auxiliary components of the vehicle, such as a compressor of an air conditioning system. Accordingly, autostart events of the engine can be performed that are non-driver induced, e.g., occurring not as a result of an operator input. In some instances, the autostart events can create lash perceivable to the operator of the vehicle when the engine turns on and is connected to the driveline.

SUMMARY

Method to control a clutch device within a transmission selectively coupling an internal combustion engine to a driveline includes controlling slip of the clutch device in response to an engine autostart event. Controlling slip includes adjusting a commanded fill pressure to the clutch device to a first predetermined magnitude that exceeds a pressure threshold until the clutch device is filled, decreasing the commanded fill pressure from the first predetermined magnitude to a second predetermined magnitude below the pressure threshold, and adjusting the commanded fill pressure in accordance with a first ramping profile and in accordance with a subsequent second ramping profile when a transmission input speed achieves a desired first transmission input speed.

BRIEF DESCRIPTION OF THE DRAWINGS

One or more embodiments will now be described, by way of example, with reference to the accompanying drawings, in which.

DETAILED DESCRIPTION

Figure 1:
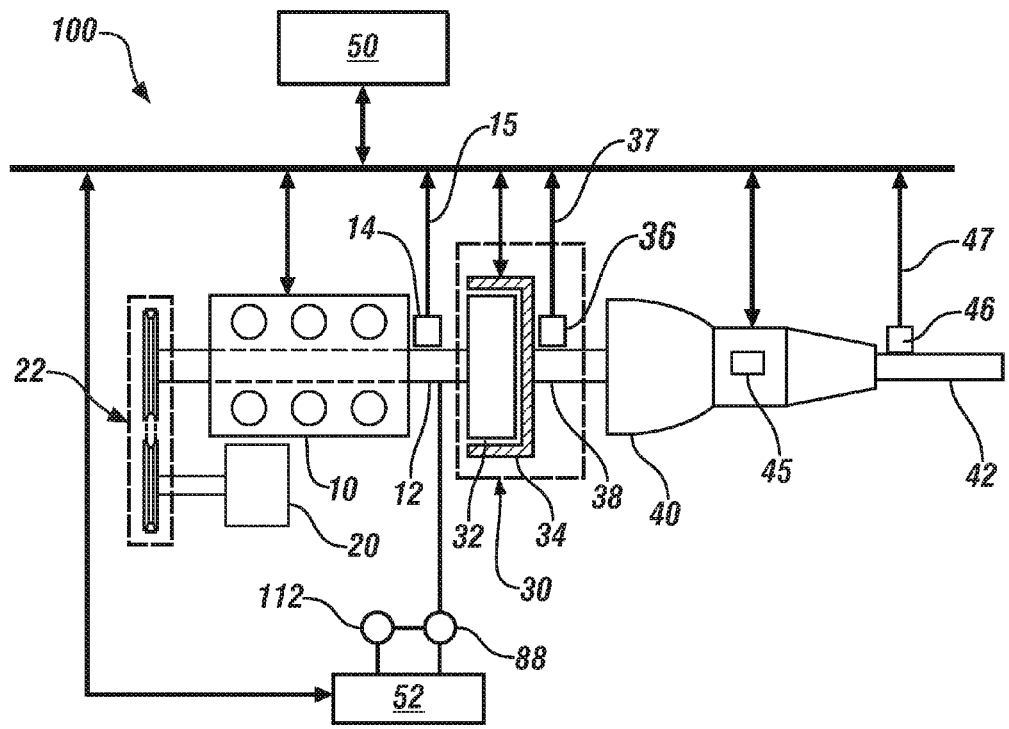
FIG. 1 illustrates a hybrid powertrain system including an internal combustion engine, a torque transfer device, a torque machine, and a transmission device configured to transfer torque to a driveline, in accordance with the present disclosure.

Referring now to the drawings, wherein the showings are for the purpose of illustrating certain exemplary embodiments only and not for the purpose of limiting the same, FIG. 1 schematically illustrates a hybrid powertrain system 100 of a vehicle including an internal combustion engine 10, a torque machine 20, and a transmission device 40 configured to transfer torque to a driveline including one or more drive wheels. The internal combustion engine 10, the torque machine 20, and the transmission device 40 are any suitable machines. In one embodiment the torque machine 20 is a multiphase electric machine that electrically connects to a high-voltage power source via an electric power inverter.

The engine 10 includes a crankshaft 12 that extends beyond each end of the engine 10. The first end of the crankshaft 12 rotatably couples to a mechanical coupler 22, which rotatably couples to the torque machine 20. The mechanical coupler 22 transfers torque between the engine 10 and the torque machine 20, and may include belts, pulleys and idlers, or alternatively may include meshingly engaged gear elements. The hybrid powertrain system 100 is arranged in a belt-alternator-starter configuration. The second end of the crankshaft 12 rotatably couples to a torque converter 30 that rotatably couples to a transmission input member 38 of the transmission 40. The torque converter 30 may be any suitable torque converter device and preferably includes an impeller 32 and corresponding turbine 34. The torque converter 30 may include a controllable torque converter clutch that locks rotations of the impeller 32 and the turbine 34.

The torque converter 30 operates as an automatic clutch element to transfer torque between the engine 10 and the transmission 40. The torque converter 30 also provides a mechanical buffer between the engine 10 and the transmission 40, acting to absorb torsional vibrations of the engine 10, transmission 40, and driveline 42. The torque converter 30 may also act to dampen variations in the engine speed under certain conditions. Specific engine operating conditions of concern include operating the torque machine 20 to spin the engine 10 during key-on engine starting events and engine restarting events during ongoing powertrain operation. Design features of a torque converter are known and not discussed in detail herein.

The transmission 40 includes a plurality of meshingly engaged gear elements selectively operative in a plurality of fixed gear ratios through activation of one or more torque-transfer devices. In an exemplary embodiment, the one or more torque-transfer devices are hydraulic clutch devices. The transmission further includes a forward torque-transfer device including a forward clutch device 45 configured to rotatably couple the transmission input member 38 and the driveline 42 when the engine is operating. Exemplary embodiments are directed toward intentionally slipping the forward clutch device 45 during a variable clutch capacity autostart event of the engine 10 so that an operator of the vehicle perceives a "neutral condition" of the powertrain while the engine is being started. The variable clutch capacity autostart event can include a non-driver induced autostart event. As used herein, the term "non-driver induced autostart event" refers to an engine autostart event that occurs not as a result of an operator input. For instance, the non-driver induced autostart event can occur when an air conditioner compressor is turning on, wherein the air conditioner is powered by a running engine via the mechanical coupler 22. Other embodiments indicative of the variable clutch capacity autostart event include a nose down grade condition when the vehicle is traveling on a downgrade that exceeds a threshold and when a state of charge of the high-voltage power source (e.g., energy storage device) supplying power to the torque machine is insufficient, i.e., less than a state of charge threshold.

A control module 50 monitors inputs from sensors and other sensing devices and controls actuators to operate the hybrid powertrain system 100. Sensors include a first sensor 14 configured to monitor rotational position and speed of the crankshaft 12 and generate a first signal corresponding to engine speed. $N_E$ 15, a second sensor 36 configured to monitor rotational speed of the turbine 34 or the transmission input member 38 and generate a second signal corresponding to turbine speed $N_T$ 37, and a third sensor 46 configured to monitor rotational speed of the driveline 42 and generate a third signal corresponding to transmission output speed $N_O$ 47. That the second sensor 36 can directly monitor the rotational speed of the transmission input member 38. Due to the rotatable coupling between the turbine 34 and the transmission input member 38, the turbine speed $N_T$ 37 can interchangeably be referred to as a transmission input speed.

A hydraulic control circuit 52, preferably controlled by the control module 50, is operative to control clutch states of the one or more hydraulic clutch devices and the forward clutch device 45 of the transmission 40. While this disclosure refers to the forward clutch device 45 as a "hydraulic clutch device" the transmission 40 is exemplary only, and embodiments discussed herein can be applied to any type of torque transfer device in a transmission 40 that has capacity. A main hydraulic pump 88 is driven off the input shaft 12 from the engine 14, and an accumulator 112 is controlled by the control module 50 to provide pressurized fluid stored therein to the hydraulic control circuit 52. In one embodiment, during an engine-OFF event, hydraulic fluid from the transmission 40 is stored in the accumulator 112 and then utilized to provide hydraulic pressure to the forward clutch device 45 during a variable clutch capacity autostart event such as a non-driver induced autostart event. Accordingly, the hydraulic control circuit 52 selectively distributes hydraulic pressure to a plurality of devices, including the one or more torque-transfer devices and the forward clutch device 45, active cooling circuits for the torque machine 20, and a base cooling circuit for cooling and lubricating the transmission 10 via plurality of passages. Exemplary embodiments are directed toward the control module 50 activating the forward clutch device 45 through a controlled slip event so that an operator of the vehicle perceives the "neutral condition" of the powertrain by reducing transmission 40 lash while the engine is being started. The controlled slip event is achieved through selective actuation of hydraulic circuit flow control devices of the hydraulic control circuit 52 including variable pressure control solenoids (PCS) and solenoid-controlled flow management valves. The hydraulic control circuit 52 is only exemplary, and this disclosure is not intended to be limited to any specific configuration.

Figure 2:
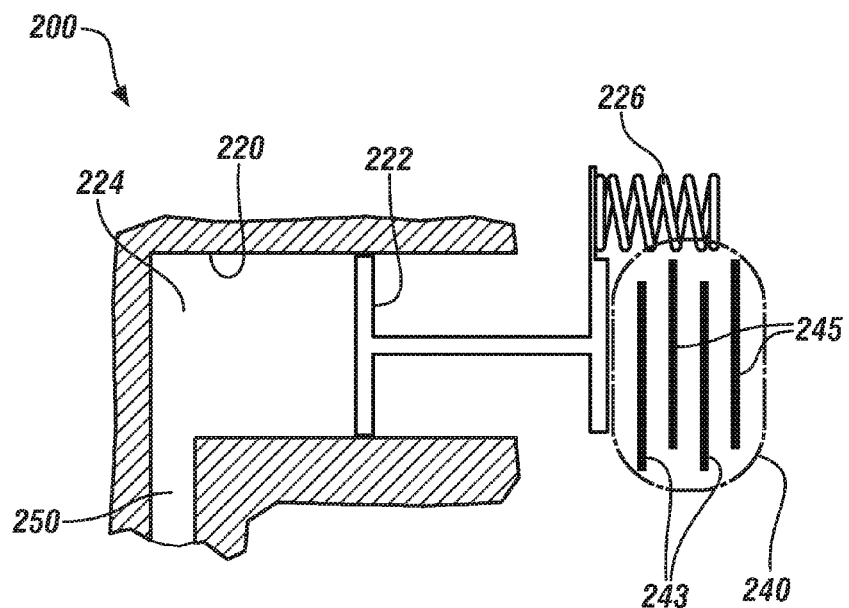
FIG. 2 illustrates an exemplary hydraulically activated clutch device operated to provide a clamping force upon a mechanical clutch, in accordance with the present disclosure.

In an exemplary embodiment, a torque transfer device can include a hydraulic clutch device having capacity in a first direction and in a second direction opposite the first direction. A hydraulically activated clutch device utilizes selectively activated pressurized flow of hydraulic fluid to create a desired motion or compression. An exemplary clutch device operates by receiving pressurized hydraulic fluid into a clutch volume chamber. FIG. 2 illustrates an exemplary hydraulically activated clutch device, e.g., hydraulic clutch device, operated to provide clamping force upon a mechanical clutch, in accordance with the present disclosure. Clutch device 200 includes a clutch cylinder 220 and a mechanical clutch 240. Exemplary embodiments are directed toward the clutch device 200 corresponding to the forward clutch device 45 of FIG. 1. The clutch device 200 includes a clutch cylinder 220 and a mechanical clutch 240. Clutch cylinder 220 includes a piston 222 and a clutch volume chamber 224. Pressurized hydraulic fluid at some fill pressure enters clutch volume chamber 224 through hydraulic line 250. Hydraulic line 250 is fluidly connected with a mechanism for selectively applying hydraulic flow, such as an exemplary PCS device. Hydraulic oil in clutch volume chamber 224 exerts pressure upon features within the volume chamber. Piston 222 transforms the fill pressure exerted by the hydraulic fluid into a force. Positive hydraulic pressure is used to fill the clutch volume chamber 224 and move piston 222 in one direction. Return spring 226 is utilized to provide force to move piston 222 in the direction opposite to the direction achieved through the application of pressurized hydraulic fluid.

Mechanical clutch 240 is selectively actuated by the transmission of force through piston 222. The mechanical clutch 240 includes input components 243 and output components 245. When the mechanical clutch 240 is deactivated, unlocked and not applied, the input and output components 243, 245, respectively, are kept separate and are free to rotate independent of one another. When the mechanical clutch 240 is activated, locked and applied, the input and output components 243, 245, respectively, are in frictional contact with one another and rotate in unison.

The input components 243 include connective surfaces in the form of input clutch plates that are mechanically coupled to an oncoming torque providing member. For instance, the oncoming torque providing member can include transmission input member 38 of FIG. 1. Accordingly, the speed of the input components can be controlled by oncoming torque provided by the engine 12 and the turbine 34 of the torque converter 30. The output components 245 include connective surfaces in the form of output clutch plates that are mechanically coupled to a torque receiving output member. It will be understood that the torque receiving output member is mechanically coupled to the driveline 42 of the transmission 40 of FIG. 1.

In the exemplary embodiment, sensors are located on the crankshaft connected to the engine, providing $N_E$ (e.g., $N_E$ 15 of FIG. 1), the transmission input member (e.g., $N_T$ 37 of FIG. 1), and the output shaft connected to the driveline, providing $N_O$ (e.g., $N_O$ 47 of FIG. 1). Accordingly, rotational speeds of the various members within the transmission are commonly monitored. Known rotational speeds of known members within the transmission 10 can be utilized to determine the rotational speeds of unknown members within the transmission based on how many degrees of freedom exist within the transmission. In an exemplary embodiment, relative rotational speed across the hydraulic clutch can be determined based on at least one of the transmission input member and a monitored rotational speed of the output shaft connected to the driveline. Accordingly, rotational speeds of the input and output components 243, 245, respectively, can be monitored.

Between rotating objects applying a torque, the torque capacity (TO generated between the input and output components 243, 245, respectively, can be determined in accordance with the following relationship:

$$T_C = r_m * f * F_A \quad [1]$$

wherein f is the coefficient of friction between the rotating objects,
$F_A$ is the axial force applied normally to direction of rotation of the objects; and
$r_m$ is a mean radius of the clutch.

As will be appreciated by one having ordinary skill in the art, the coefficient of friction f changes depending upon whether there is relative movement between the two objects. The axial force $F_A$ in mechanical clutch 240 is generated by compressive force transmitted through piston 222.

Exemplary embodiments are directed toward the hydraulic clutch device 200 including the forward clutch device 45 of FIG. 1. In response to a variable clutch capacity autostart event, e.g., a non-driver induced autostart event, of the engine 10, the forward clutch device 45 can be activated through a controlled slip event before being applied. As aforementioned, the term "non-driver induced autostart event" refers to an autostart event of the engine that is not a result of an operator input, e.g., an operator torque request. In a non-limiting example, the non-driver induced autostart event can include a vehicle's air conditioner compressor turning on and thus requiring power from a running engine. Variable clutch capacity autostart events can also include autostart events during a nose down grade condition and when the state of charge of the electrical energy storage device supplying power to the torque machine 20 is insufficient. The controlled slip event enhances the vehicle operator's perception of a neutral condition by reducing powertrain disturbance since the transmission input member 38 is disconnected from the driveline while the forward clutch device 45 is slipping.

Figure 3:
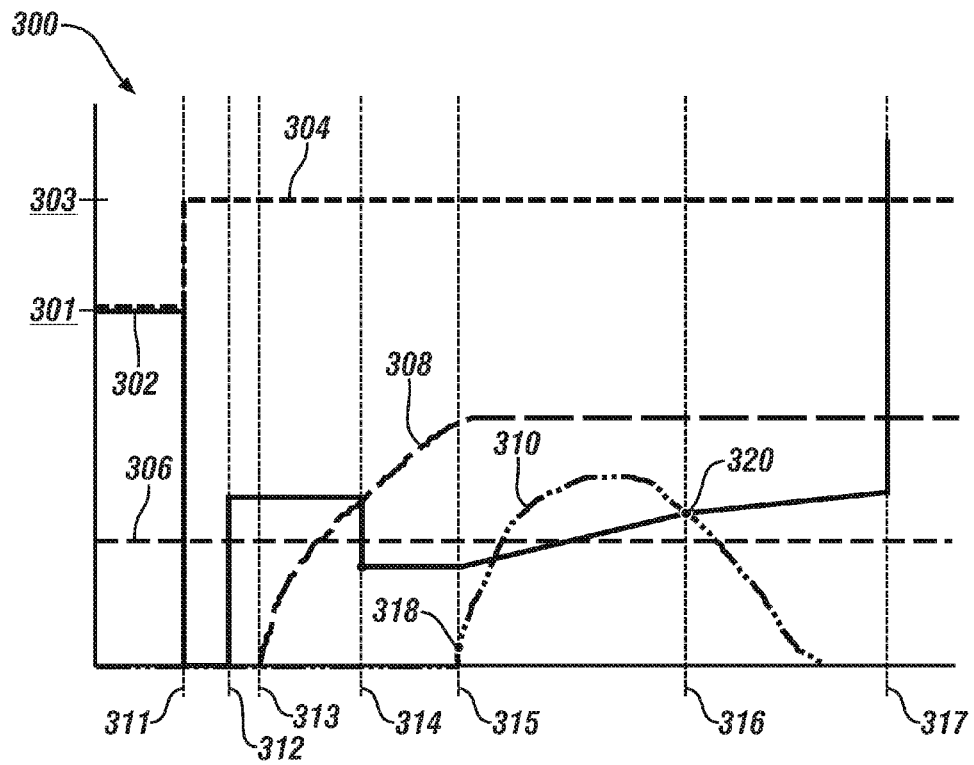
FIG. 3 illustrates a controlled slip event of the forward clutch device of FIG. 1 by controlling a commanded fill pressure, in accordance with the present disclosure.

FIG. 3 illustrates a plot 300 of a controlled slip event of the forward clutch device 45 of FIG. 1 including controlling a commanded fill pressure of the clutch device 45, in accordance with the present disclosure. The horizontal axis represents time (seconds) and the vertical axis represents pressure (Pa) and solenoid state (ON/OFF). At the point of origin, the pressure is zero. Profile line 302 represents a commanded fill pressure. Profile line 304 represents the solenoid state, wherein the solenoid state is in the OFF state at hash line 301 and the solenoid state is in the ON state at hash line 303. Dashed horizontal line 306 represents a pressure threshold. The pressure threshold 306 can be expressed in terms of torque capacity (e.g., load), wherein the pressure threshold 306 is indicative of a magnitude of required actual fill pressure within the volume chamber 224 to overcome a reactive load exerted by the return spring 226 such that torque capacity at the forward clutch device 45 can occur through translation of the piston 222 in a direction opposite to the reactive load exerted by the return spring 226. Simply put, the pressure threshold 306 indicates the magnitude of required actual fill pressure within the clutch device for torque capacity at the clutch device to occur. Thus, when the actual fill pressure within the volume chamber 224 includes a magnitude that is at least the pressure threshold 306, torque capacity at the forward clutch device 45 can occur. No torque capacity at the forward clutch device 45 occurs for magnitudes of actual fill pressure within the volume chamber 224 that are less than the pressure threshold 306.

Profile line 308 represents engine speed and profile line 310 represents turbine speed. In some embodiments, the turbine speed can be expressed as the rotational speed of the transmission input member 38, i.e., the transmission input speed. Dashed vertical lines 311-317 each represent a respective point in time during the controlled slip event of the forward clutch device 45 in response to a variable clutch capacity autostart event, such as the non-driver induced autostart event, of the engine 10.

At dashed vertical line 311, a non-driver induced autostart event of the engine is detected and a controlled slip event of the forward clutch device 45 is initiated in response to the non-driver induced autostart event. The controlled slip event can be initiated in response to any type of variable clutch capacity autostart event. Accordingly, the solenoid state 304 is commanded from the OFF state 301 to the ON state 303. When the solenoid state is commanded to the ON state, the variable pressure control solenoids (PCS) and solenoid-controlled flow management valves of the hydraulic control circuit 52 are actuated to enable hydraulic fluid stored in the accumulator 112 to be utilized to provide hydraulic pressure to the forward clutch device 45 during the non-driver induced autostart event. Utilizing hydraulic fluid stored in the accumulator 112 for providing pressurized fluid to the forward clutch device 45 allows for a quicker response time for activating the forward clutch device 45 during autostart events than utilizing hydraulic fluid stored in the main hydraulic pump 112. Simultaneously, the commanded fill pressure 302 is commanded to zero. The commanded fill pressure 302 remains at zero until dashed vertical lines 312, wherein a neutral state exists and engine starting is occurring between dashed vertical lines 311 and 312. As used herein, the term "neutral state" refers to the engine 10 not being coupled to the driveline 42 and the forward clutch device 45 being deactivated and not applied. Engine starting can include spinning and/or fueling the engine 10. The period of time between dashed vertical lines 311 and 312 can be based on a required time needed for the engine starting to occur.

At dashed vertical line 312, the commanded fill pressure 302 is increased to a first predetermined magnitude that exceeds the pressure threshold 306. While the non-limiting example illustrates increasing the commanded fill pressure 302 from zero, embodiments are envisioned that adjust (e.g., increase or decrease) the commanded fill pressure 302 from any value to the first predetermined value that exceeds the pressure threshold 306. The clutch device 45 is not applied at dashed vertical line 312, and is not considered completely applied until dashed vertical line 317. The first predetermined magnitude can be referred to as a filling magnitude. The commanded fill pressure 302 remains constant for a first predetermined period of time between dashed vertical lines 312 and 314. The first predetermined period of time between dashed vertical lines 312 and 314 can be referred to as a filling phase, wherein the pressurized hydraulic fluid enters the clutch volume chamber 224 at the commanded fill pressure (i.e., at the filling magnitude). The actual fill pressure of the pressurized hydraulic fluid within the volumetric chamber 224 achieves the commanded fill pressure 302 corresponding to the filling magnitude at dashed vertical line 314, wherein the filling phase is ended. Accordingly, the first predetermined period of time that includes the filling phase can be determined as a function of a volume model of the volume chamber 224 of the forward clutch device 45. At dashed vertical line 313 within the filling phase, the engine speed begins to increase from zero.

At dashed vertical line 314, the commanded fill pressure 303 is decreased from the first predetermined magnitude (e.g., filling magnitude) to a second predetermined magnitude below the pressure threshold 306. The second predetermined magnitude can be referred to as a slip initiating magnitude. The commanded fill pressure 303 remains constant at the slip initiating magnitude until dashed vertical line 315.

At dashed vertical line 315, the turbine speed 310 (e.g., transmission input speed) achieves a desired non-zero integer at point 318. The desired non-zero integer at point 318 can be referred to as a desired first transmission input speed. In other words, the turbine speed 310 increases from zero to the desired non-zero integer (e.g., desired first transmission input speed) corresponding to point 318 at dashed vertical line 315. Accordingly, when the turbine speed 310 becomes the desired non-zero integer corresponding to the desired first transmission input speed at dashed vertical line 315, a slipping phase of the forward clutch device 45 is initiated. The slipping phase, initiated at dashed vertical line 315, includes adjusting the commanded fill pressure 302 in accordance with a first ramping profile and in accordance with a subsequent second ramping profile prior to applying the clutch device 45. Furthermore, the period of time between dashed vertical lines 313 and 315 can be expressed as a reaction time for the turbine speed (e.g., transmission input speed) to achieve the desired first transmission input speed (e.g., desired non-zero integer at point 318) from when the engine speed began increasing from zero at dashed vertical line 313. The commanded fill pressure 302 begins increasing from the second predetermined magnitude (e.g., slip initiating magnitude) at dashed vertical line 315 in accordance with the first ramping until dashed vertical line 316. The first ramping profile includes an open-loop control routine. The engine speed 308 is stabilized at a desired engine idle speed at or around dashed vertical line 315.

At dashed vertical line 316, a magnitude of the commanded fill pressure 302 is greater than the pressure threshold 306 and the actual fill pressure within the volumetric chamber 224 is at least the pressure threshold 306 to overcome the reactive load exerted by the return spring 226 such that an oncoming torque capacity at the forward clutch device 45 is detected. Accordingly, the first ramping profile is ended at dashed vertical line 316 when the oncoming torque capacity is detected. The first ramping profile includes a predetermined slope resulting in the oncoming torque capacity being detected at a desired second transmission input speed. For instance, the predetermined slope is selected such that the magnitude of the actual fill pressure, resulting in the detected oncoming torque capacity, occurs at the desired second transmission input speed. In the illustrated non-limiting exemplary plot 300, the desired second transmission input speed corresponds to the turbine speed 310 (e.g., transmission input speed) at point 320. Thus, the predetermined slope of the first ramping profile between dashed vertical lines 315 and 316 is a function of the volume of the volumetric chamber 224 of the forward clutch device 45 and the desired second transmission input speed.

The commanded fill pressure 302 is increased in accordance with the second ramping profile when the oncoming torque capacity is detected at dashed vertical line 316. The second ramping profile includes a closed-loop control routine. The closed loop routine includes monitoring the rotational speeds between the input and output components 243, 245, respectively. A magnitude of the difference between the rotational speeds of the input and output components 243, 245, respectively, may be referred to as a magnitude of clutch slip or magnitude of slip across the clutch device. As the magnitude of actual fill pressure is increased in response to the increasing commanded fill pressure, the magnitude of clutch slip is reduced. When the magnitude of clutch slip is less than an activation threshold, the input and output components 243, 254, respectively, become compressed and the forward clutch device 45 is applied. In the illustrated non-limiting exemplary plot 300, the second ramping profile is ended and the forward clutch device 45 is applied at dashed vertical line 317 whereat the commanded fill pressure 302 is increased to a predetermined pressure sufficient for maintaining application of the forward clutch device 45. Accordingly, a slipping phase occurs between dashed vertical lines 315 and 317, wherein the commanded fill pressure 302 is increased in accordance with the first ramping profile and in accordance with the subsequent second ramping profile. The slipping phase of the controlled slip event enhances the vehicle operator's perception of a neutral condition by reducing powertrain disturbance since the transmission input member 38 is disconnected from the driveline while the forward clutch device 45 is slipping.

Exemplary embodiments are further directed toward monitoring the magnitude of clutch slip of the forward clutch device during the slipping phase between dashed vertical lines 315 and 317. As aforementioned, the term "magnitude of clutch slip" refers to the magnitude of difference between the rotational speeds of the input and output components 243, 245, respectively. The magnitude of clutch slip is compared to a magnitude of allowed slip during the slipping phase between dashed vertical lines 315 and 317. Based on the comparison, if a difference between the magnitude of clutch slip and the magnitude of allowed clutch slip is at least a predetermined slip threshold indicative of undesirably excessive slip, a flag condition is set. If the flag condition is set at least a predetermined number of times during a drive cycle, a fault condition can be detected in the forward clutch device. The fault condition can be displayed to the operator of the vehicle, alerting the operating that the vehicle may require service.

Figure 4:
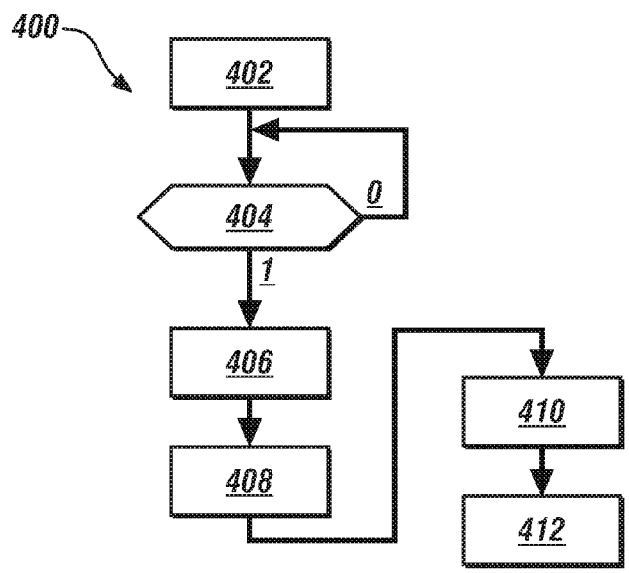
FIG. 4 illustrates a controlled slip event of the forward clutch device in response to a variable clutch capacity autostart event of the engine of FIG. 1, in accordance with the present disclosure.

FIG. 4 illustrates a flowchart 400 of a controlled slip event of the forward clutch device 45 of FIG. 1 in response to a variable clutch capacity autostart event of the engine 10, in accordance with the present disclosure. The exemplary flowchart 400 can be implemented within the control module 50 illustrated in FIG. 1. The flowchart 400 can be described with reference to the non-limiting exemplary plot 300 of FIG. 3. Table 1 is provided as a key to FIG. 4 wherein the numerically labeled blocks and the corresponding functions are set forth as follows.

TABLE 1

| BLOCK | BLOCK CONTENTS |
|---|---|
| 402 | Start. |
| 404 | Is a variable clutch capacity autostart event detected? |
| 406 | Adjust a commanded fill pressure to a forward clutch device to a first predetermined magnitude that exceeds a pressure threshold. |
| 408 | Decrease the commanded fill pressure from the first predetermined magnitude to a second predetermined magnitude below the pressure threshold. |
| 410 | Increase the commanded fill pressure from the second predetermined magnitude in accordance with a first ramping profile. |
| 412 | Increase the commanded fill pressure in accordance with a second ramping profile prior to clutch device application. |

The flowchart 400 starts at block 402 and proceeds to block 404 where it is determined whether a variable clutch capacity autostart event is detected. In one embodiment, the variable clutch capacity autostart event can include a non-driver induced autostart event. In another embodiment, the variable clutch capacity autostart event can include a nose down grade condition when the vehicle is traveling on a downgrade that exceeds a threshold. In yet another embodiment, the variable clutch capacity autostart event can include autostart events when a state of charge of the electrical energy storage device is insufficient. As aforementioned, the non-driver induced autostart event includes an engine autostart event that occurs not as a result of an operator input. For instance, the non-driver induced autostart event can occur when an air conditioner compressor is turning on, wherein the air conditioner is powered by a running engine via the mechanical coupler 22. A "0" denotes that the variable clutch capacity autostart event is not detected, and the flowchart 400 reverts back to decision block 404. A "1" denotes that the variable clutch capacity autostart event is detected, and the flowchart 400 initiates a controlled slip event of the forward clutch device 45 and proceeds to block 406. The controlled slip event includes intentionally slipping the forward clutch device 45 during the autostart event of the engine 10 so that the operator of the vehicle perceives a "neutral condition" of the powertrain while the engine is being started to increase drivability by reducing lash within the powertrain.

Referring to block 406, a commanded fill pressure to the forward clutch device 45 is adjusted to a first predetermined magnitude that exceeds a pressure threshold. The first predetermined magnitude can be referred to as a filling magnitude to fill the clutch device 45 with hydraulic pressure from hydraulic fluid obtained from the accumulator 112. The pressure threshold indicates a magnitude of required actual fill pressure within the forward clutch device 45 for torque capacity at the clutch device 45 to occur. In some embodiments, torque capacity within the clutch device 45 can be determined utilizing Eq. [1]. The commanded fill pressure is maintained at the first predetermined magnitude (e.g., filling magnitude) until the clutch device 45 is filled. Referring to FIG. 3, the commanded fill pressure is maintained at the filling magnitude between dashed vertical lines 312 and 314, wherein the period of time between dashed vertical lines 312 and 314 can be referred to as a filling phase. The clutch device is filled when an actual fill pressure within the clutch device achieves the first predetermined magnitude.

The commanded fill pressure may first be commanded to zero in response to the variable clutch capacity autostart event, wherein a true neutral state exists for a period of time (e.g., between dashed vertical lines 311 and 312 of FIG. 3) while the engine is being started. Thereafter (e.g., at dashed vertical line 312), adjusting the commanded fill pressure includes increasing the commanded fill pressure to the first predetermined magnitude from the commanded fill pressure of zero. Other embodiments can include decreasing the commanded fill pressure to the first predetermined magnitude from a previous commanded fill pressure that was greater than the first predetermined magnitude.

Referring to block 408 (and dashed vertical line 314 of FIG. 3), the commanded fill pressure is decreased from the first predetermined magnitude to a second predetermined magnitude below the pressure threshold. The second predetermined magnitude can be referred to as a slip initiating magnitude. The commanded fill pressure is maintained at the second predetermined magnitude until a transmission input speed (e.g., turbine speed) achieves a desired first transmission input speed. Referring to the non-limiting exemplary plot 300 of FIG. 3, the commanded fill pressure is maintained at the second predetermined magnitude between dashed vertical lines 314 and 315. When the transmission input speed achieves the desired first transmission input speed, a slipping phase is initiated and the flowchart 400 proceeds to block 410.

Referring to block 410, the commanded fill pressure is adjusted in accordance with a first ramping profile. Referring to the non-limiting exemplary plot 300 of FIG. 3, the first ramping profile is located between dashed vertical lines 315 and 316. The adjusting the commanded fill pressure includes increasing the commanded fill pressure from the second predetermined magnitude in accordance with the first ramping profile until oncoming torque capacity at the clutch device 45 is detected. A magnitude of actual fill pressure within the clutch device must be at least the pressure threshold when the oncoming torque capacity is detected. The first ramping profile includes an open loop control, wherein the first ramping profile includes a predetermined slope resulting in the oncoming torque capacity being detected at a desired second transmission input speed. Referring to FIG. 3, the desired second transmission input speed includes point 320. In other words, when both the oncoming torque capacity is detected within the clutch device and the transmission input speed is equal to the desired second transmission input speed, the first ramping profile is ended, and the flowchart 400 proceeds to block 412.

Referring to block 412, the commanded fill pressure is adjusted in accordance with a subsequent second ramping profile. Referring to the non-limiting exemplary plot 300 of FIG. 3, the second ramping profile is located between dashed vertical lines 316 and 317. The adjusting the commanded fill pressure includes increasing the commanded fill pressure in accordance with the second ramping profile to apply the clutch. The second ramping profile includes a closed loop control, wherein a magnitude of clutch slip of the clutch device 45 is monitored while the commanded fill pressure is increased in accordance with the second ramping profile. The magnitude of clutch slip is compared to an activation threshold and the clutch device 45 is applied when the magnitude of clutch slip is less than the activation threshold. With reference to FIG. 2, the magnitude of actual fill pressure within the clutch device is increasing as the commanded fill pressure is increasing, and thus, hydraulic pressure exerted upon the piston 222 is increased to overcome a reactive load exerted by the return spring 226 compressing the input and output components 243, 245, respectively. As the input and output components 243, 245, respectively, become more compressed, the magnitude of clutch slip decreases.

Blocks 410 and 412 collectively include the slipping phase of the forward clutch device 45, wherein the commanded fill pressure is adjusted in accordance with the first ramping profile and in accordance with the subsequent second ramping profile prior to applying the clutch device 45. The slipping phase of the controlled slip event enhances the vehicle operator's perception of a neutral condition by reducing powertrain disturbance since the transmission input member 38 is disconnected from the driveline while the forward clutch device 45 is slipping.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a clutch device, within a transmission, selectively coupling an internal combustion engine to a driveline, comprising:
    in response to an engine autostart event, controlling slip of the clutch device, comprising:
        adjusting a commanded fill pressure to the clutch device to a first predetermined magnitude that exceeds a pressure threshold until the clutch device is filled;

decreasing the commanded fill pressure from the first predetermined magnitude to a second predetermined magnitude below the pressure threshold; and when a transmission input speed achieves a desired first transmission input speed, adjusting the commanded fill pressure in accordance with a first ramping profile and in accordance with a subsequent second ramping profile.

2. The method of claim 1, wherein the pressure threshold indicates a magnitude of required actual fill pressure within the clutch device for torque capacity at the clutch device to occur.

3. The method of claim 1, wherein adjusting the commanded fill pressure to the clutch device to the first predetermined magnitude comprises:

increasing the commanded fill pressure to the first predetermined magnitude from a previously commanded fill pressure after a period of time has elapsed since initiating the controlled slip event, wherein the previously commanded fill pressure is effective to establish a neutral state between the engine and the driveline.

4. The method of claim 1, wherein the clutch device is filled when an actual fill pressure within the clutch device achieves the first predetermined magnitude.

5. The method of claim 1, further comprising:

during adjusting the commanded fill pressure in accordance with the first ramping profile and in accordance with the subsequent second ramping profile:

monitoring a magnitude clutch slip of the clutch device;

if a difference between the magnitude of clutch slip and a magnitude of allowed clutch slip is at least a slip threshold, setting a flag condition; and detecting a fault condition if the flag condition is set at least a predetermined number of times during a drive cycle.

6. The method of claim 1, wherein the engine autostart event comprises a variable clutch capacity autostart event.

7. The method of claim 6, wherein the variable clutch capacity autostart event includes a non-driver induced autostart event that is not a result of an operator input.

8. The method of claim 1, wherein the commanded fill pressure is maintained at the second predetermined magnitude until the transmission input speed achieves the desired first transmission input speed.

9. The method of claim 8, wherein the transmission input speed corresponds to a turbine speed of a torque converter transferring torque between the engine and the transmission.

10. The method of claim 1, wherein adjusting the commanded fill pressure in accordance with the first ramping profile and in accordance with the subsequent second ramping profile comprises:

increasing the commanded fill pressure from the second predetermined magnitude in accordance with the first ramping profile until oncoming torque capacity at the clutch device is detected; and subsequent to the detected oncoming torque capacity, increasing the commanded fill pressure in accordance with the second ramping profile prior to clutch device application.

11. The method of claim 10, wherein a magnitude of actual fill pressure within the clutch device is at least the pressure threshold when the oncoming torque capacity at the clutch device is detected.

12. The method of claim 10, wherein the first ramping profile comprises a predetermined slope resulting in the oncoming torque capacity being detected at a desired second transmission input speed.

13. The method of claim 10, wherein increasing the commanded fill pressure in accordance with the second ramping profile further comprises:

monitoring a magnitude of slip across the clutch device;

comparing the magnitude of slip to an activation threshold; and applying the clutch device when the magnitude of clutch slip is less than the activation threshold.

14. Method to control hydraulic fluid provided to a clutch device within a transmission selectively coupling the engine to a driveline, comprising:

in response to a variable clutch capacity autostart event of the engine:

adjusting a commanded fill pressure to the clutch device to a filling magnitude that exceeds a pressure threshold, and maintaining the filling magnitude for a predetermined period of time until an actual fill pressure within the clutch device achieves the filling magnitude;

when the actual fill pressure achieves the filling magnitude, decreasing the commanded fill pressure from the filling magnitude to a slip initiating magnitude below the pressure threshold, and maintaining the slip initiating magnitude until a transmission input speed achieves a desired first transmission input speed;

initiating a slipping phase in response to the transmission input speed achieving the desired first transmission input speed, the slipping phase comprising:

increasing the commanded fill pressure from the slip initiating magnitude in accordance with a first ramping profile until oncoming torque capacity at the clutch device is detected, and subsequent to the detected oncoming torque capacity, increasing the commanded fill pressure in accordance with a second ramping profile prior to clutch device application.

15. The method of claim 14, wherein the pressure threshold corresponds to an actual fill pressure within the clutch device for torque capacity at the clutch device to occur.

16. The method of claim 14, wherein the predetermined period of time that the commanded fill pressure is maintained at the filling magnitude comprises a filling phase based on a volume model of the clutch device.

17. The method of claim 14, wherein engine speed is stabilized at a desired engine idle speed during the slipping phase.

18. The method of claim 14, wherein a magnitude of actual fill pressure within the clutch device is at least the pressure threshold when the oncoming torque capacity at the clutch device is detected.

19. The method of claim 14, wherein the first ramping profile comprises a predetermined slope selected such that the detected oncoming torque capacity occurs at the desired second transmission input speed.

20. The method of claim 14, wherein the variable clutch capacity autostart event of the engine includes a non-driver induced autostart event that is not a result of an operator input.

* * * * *